(No Model.)  3 Sheets—Sheet 1.

F. G. FRICK.
MAGNETO AND DYNAMO ELECTRIC MACHINE.

No. 295,534.  Patented Mar. 25, 1884.

Witnesses:
J. Haib
Chas. H. Smith

Inventor:
Friedrich Gustav Frick
per Lemuel W. Serrell
atty (No Model.) 3 Sheets—Sheet 2.
F. G. FRICK.
MAGNETO AND DYNAMO ELECTRIC MACHINE.
No. 295,534. Patented Mar. 25, 1884.
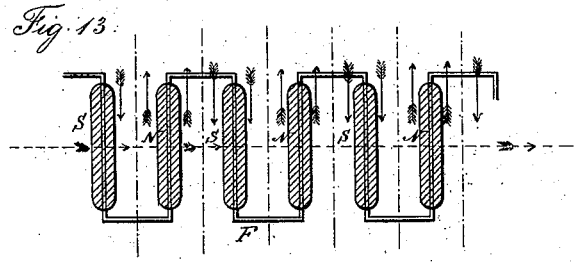
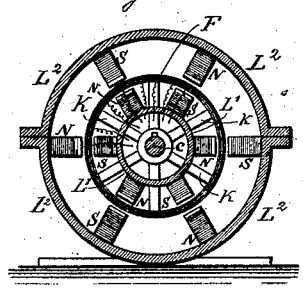
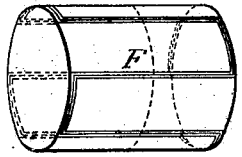
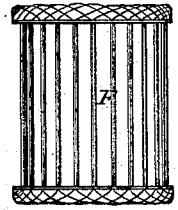
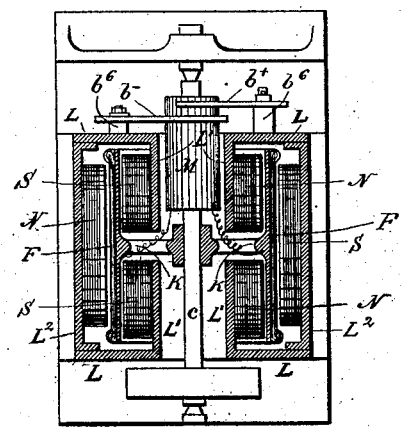
Witnesses:
Inventor:
Friedrich Gustav Frick
per Lemuel W. Serrell atty (No Model.) 3 Sheets—Sheet 3.
F. G. FRICK.
MAGNETO AND DYNAMO ELECTRIC MACHINE.
No. 295,534. Patented Mar. 25, 1884.
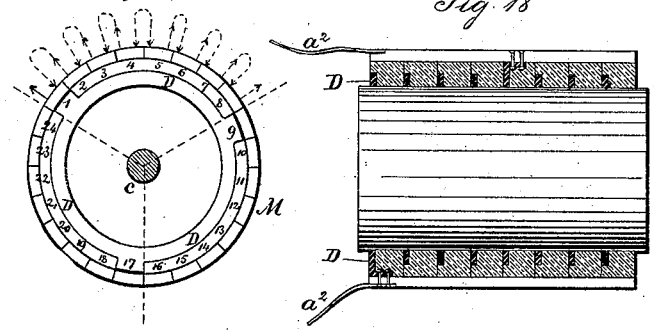
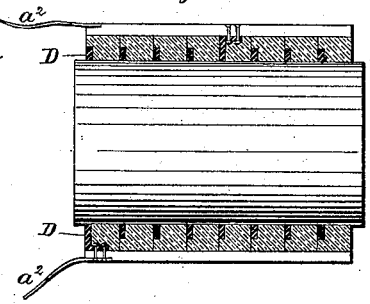
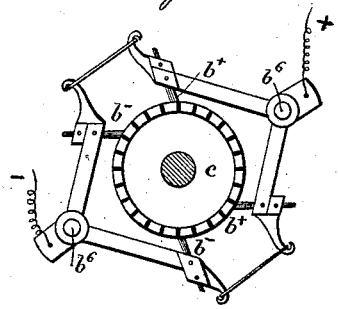
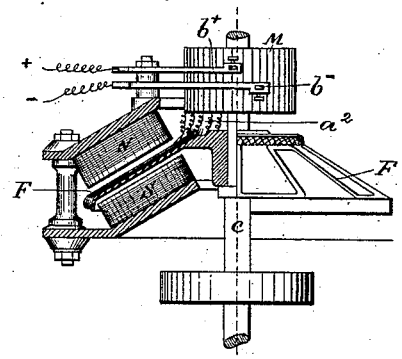
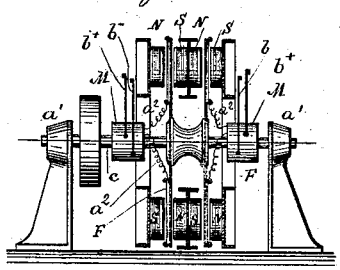
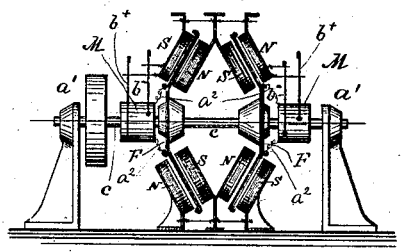
Witnesses
J. Haib
Chas. H. Smith
Inventor
Friedrich Gustav Frick
per Lemuel W. Serrell
atty

UNITED STATES PATENT OFFICE.

FRIEDRICH GUSTAV FRICK, OF BAYENTHAL, NEAR COLOGNE, GERMANY.

MAGNETO AND DYNAMO ELECTRIC MACHINE.

SPECIFICATION forming part of Letters Patent No. 295,534, dated March 25, 1884.

Application filed March 19, 1883. (No model.) Patented in Germany December 6, 1877, No. 3,147.

*To all whom it may concern:*

Be it known that I, FRIEDRICH GUSTAV FRICK, of Bayenthal, near Cologne, on the Rhine, Germany, have invented an Improvement in Magneto and Dynamo Electric Machines, (for which a patent was granted to me in the Empire of Germany, dated December 6, 1877, No. 3,147,) of which the following is a specification.

The armature-wheel is composed of induction-coils of insulated copper wire. The coils of the wire do not form a circle, but are wound in a zigzag form. This bobbin serves for rotating bodies or armatures for magneto-electric and dynamo-electric machines, in place of the known ring of Gramme.

I will proceed to describe the general principles involved in my improvements.

Figure 1:
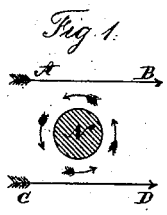

In Figure 1, N represents the north pole of a magnet as surrounded by electric currents according to the theory of Ampère, the direction being indicated by the arrows. If a copper wire, A B, is quickly carried over the magnet to C D, it will receive an induction-current—viz., above, a current in the direction A B, in opposition to the Ampère currents; below, a current in the direction C D, corresponding with the Ampère currents. If a south pole takes the place of the north pole, it will set up an induced current in the opposite direction.

Figure 2:
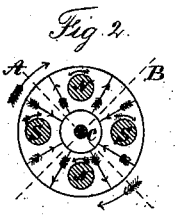
Figure 3:
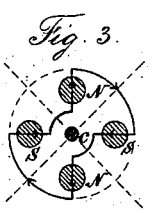
Figure 4:
Figure 5:
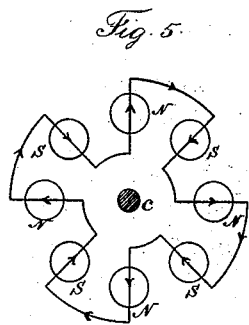
Figure 6:
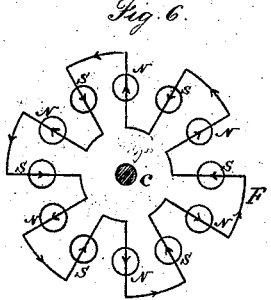

In Fig. 2, c is the center of a circular disk, in which four copper wires are fixed radially. N N are two north poles. S S are two south poles of magnets placed behind the disk. If the disk is turned in the direction A B, (to the right hand,) there will be generated in all wires lying to the right and to the left of the north poles induction-currents in the direction toward the circumference, and in all wires next to the south poles induction-currents in the direction toward the center. If the magnet-poles behind the disk are faced by poles of opposite polarity in front of the disk, the direction of currents generated by these poles will be the same as before; but the induction-currents themselves will be increased. If, now, the radial copper wires of the disk are connected at their ends alternately with each other, as shown in Fig. 3, the simple zigzag is obtained, having two loops in the wire, in which coils or loops the induction-currents generated are united or accumulated and move in one direction. With six magnet-poles in alternate position and behind the disk, as shown in Fig. 4, the zigzag has three parts or loops; with eight such magnet-poles, four parts or loops, Fig. 5, and with twelve such magnet-poles six parts or loops, Fig. 6. An armature-wheel, F, is constructed, with many layers of such insulated coils of copper wire placed side by side or above each other. The bobbin may be arranged either on a disk with radial wires, Figs. 3 to 6, or on a conical-shaped surface, Fig. 21, or on a cylindrical surface, Fig. 15.

Figure 7:
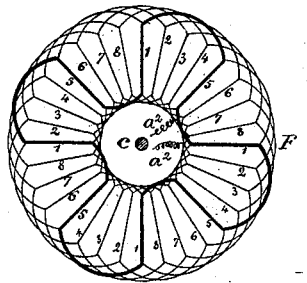

Fig. 7 illustrates an armature constructed with eight layers of said four-looped bobbins, for an induction-machine. The eight bobbins are equally distributed in the quadrant from the north pole over the south pole to the next north pole.

Figure 8:
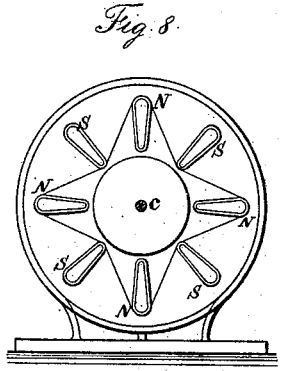

Fig. 8 shows the frame of the machine with eight field-magnet poles, before which the armature-disk, Fig. 7, shall rotate. While the disk is rotating, all the radial wires or coils within the zone of the north pole will receive the current toward the middle. The radial wires or bobbins within the zone of the south pole will receive the current toward outside. These currents from the loops or coils are conducted to commutator-plates, Figs. 9 and 10, upon which the brushes or contact-springs rest and take up the current and conduct it to the field-magnet helices or the external circuits, or both. This commutator is constructed of an inner cylinder of wood or other non-conducting material. Upon this cylinder eight copper rings are placed, insulated from each other, each ring being provided with four external radial projections. There are twenty-four radial longitudinal bars around the cylinder insulated from each other, which compose the surface of this commutator. The projections of the copper rings are electrically connected successively to the longitudinal bars, the number or designation corresponding to those of the loops. The radial pieces on the rings, and numbered 1 to 8, and situated in the first quadrant, are connected by wires (indicated at $a^2$, Fig. 7) with the inner parts of the zigzag bobbin of the disk in such a manner that the first bobbin begins on 1 and terminates on 2, the second bobbin begins on 2 and terminates on 3, the third bobbin begins on 3 and terminates on 4, the fourth bobbin begins on 4 and terminates on 5, the fifth bobbin begins on 5 and terminates on 6, the sixth bobbin begins on 6 and terminates on 7, the seventh bobbin begins on 7 and terminates on 8, and the eighth bobbin begins on 8 and terminates on 1. The commutator and the armature disks are securely fastened upon an axis or central shaft, $c$, that is supported in suitable bearings or journal-boxes, $a'$.

Figure 9:
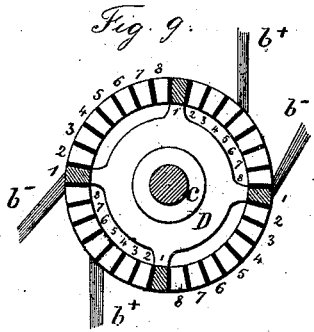
Figure 10:
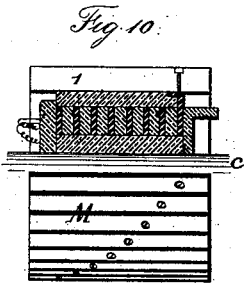

Two brushes or contact-springs are fixed to the frame of the machine, and so applied as to correspond with the neutral lines lying between the poles. For greater safety, several of these brushes are applied, in order to prevent the production of sparks. In Fig. 9 the brushes are represented at $b-$ and $b+$.

Figure 11:
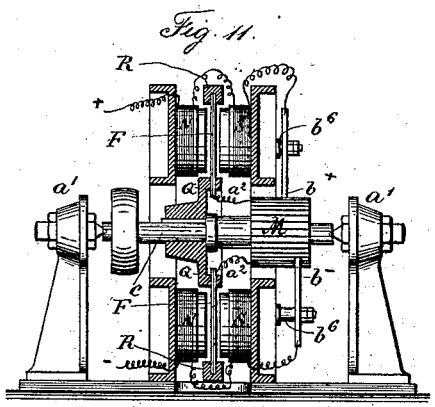
Figure 12:
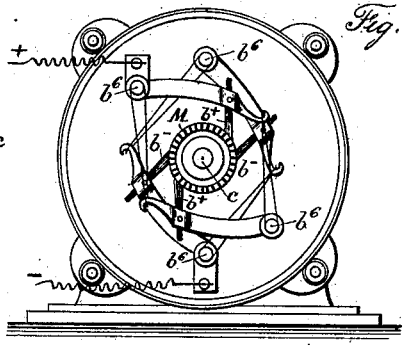

Figs. 11 and 12 represent a dynamo-electric machine, Fig. 11 being a partial longitudinal section, and Fig. 12 an elevation endwise of the shaft, with the frame removed. In these the circular disk above described is between eight pairs of electro-magnets, arranged as in Fig. 8, whose magnetism is produced by the induced current itself after a battery-current has been once sent through the helices. The small remaining amount of magnetism of the iron cores will always be sufficient to start the operation, the current set up in the helices of the armature being passed through the field-helices, as in other dynamo-generators heretofore in use.

Fig. 13 represents a zigzag bobbin, with three loops adapted to the surface of a cylinder, but laid out in a plane. Fig. 15 represents the same wound upon the surface of a cylinder. Fig. 16 is a diagram representing the surface of a cylinder on which eight ranges of such three-looped zigzag bobbins are applied, the same being suitable for the magneto-electric machine represented in Figs. 14 and 17 in cross-section and longitudinal section.

The cylindrical armature F in this machine is connected at the middle with the axis or shaft $c$ by radial arms and a suitable rim forming a wheel, K. All the wire ends of the eight single zigzag bobbins are carried inwardly in the plane of these cross-arms, and are connected with the commutator-plates.

The electro-magnets outside the armature-cylinder F are supported within a cylindrical casing, $L^2$, and those placed inside are made shorter in length, so as to employ two ranges—one at each side of the central wheel K—and these magnets are supported upon brackets L', extending inwardly from the heads L. The commutator for this three-looped arrangement with eight bobbins is represented in Figs. 18 and 19, and the brushes or contact-springs $b-$ $b+$ are represented in Fig. 20 as upon arms extending from stationary studs $b^6$. The directions of currents and the connections of wires are indicated by arrows.

Fig. 21 shows a partial section of a machine with a conical-shaped armature-wheel; Fig. 22, a machine with two circular disk-armatures, and Fig. 23 shows two conical-shaped armature-wheels. At the commencement of rotation the current from a battery will be passed through the field-helices, and afterward the induced current will supplement the battery-current.

From the foregoing general description of the principles involved in this machine, and the illustrations shown in the drawings, it will be apparent to an electrician that the features which distinguish this dynamo-electric machine from those which had preceded it relate, primarily, to the radial armature-wires connected in loops alternately at the outer and inner ends, so as to form a circuit in which the induced current is set up in the different portions, so as to flow toward and from the connections to the commutator-plates, and these wires, passing in front of the poles of the field-magnets or between opposite poles, receive the greatest magnetic influence by being close to such poles, so that the greatest amount of induced current is developed.

The mode of constructing the field-magnets and connecting them in the circuit, so as to obtain the proper polarity of the cores by the current passing through the same, is well known, and is similar to that in the Gramme machine; and I remark that any suitable means may be employed for holding the wires in their proper position, both at the outer and inner portions of the loops. In Fig. 11 the inner ends are represented as received at the edge of a hub, Q, and the outer ends as secured to a ring, R, and the wires $a^2$ pass off to the commutator-bars M.

Upon reference to Figs. 9, 10, 18, and 19, the mode of constructing the commutator bars and rings will be apparent, the spaces between the rings and beneath the bars being filled with insulating material. The rings are separated thereby, and the longitudinal commutator-bars are supported thereon, and each ring is connected to its proper number of the commutator-bars. In Fig. 19 there are three of the bars, 1, 9, and 17, shown as connected to the ring D, and at $a^2$, Fig. 18, the circuit-wire connections are shown.

I claim as my invention—

1. In a magneto or dynamo electric machine, the combination, with the field-magnets, of a revolving armature-disk having radial wires connected in a closed circuit and to commutator-plates, substantially as set forth.

2. The combination, with the field-magnets, of a revolving armature-disk having radial wires connected to the commutator, substantially as set forth, and having a support around the outer portions of such radial wires, and means for connecting the inner portions of such wires to the revolving shaft, substantially as set forth.

3. The combination, in a dynamo or magneto electric machine, of an armature composed of radial wires connected in a closed circuit at the outer and inner portions of such radial wires alternately, as set forth.

4. The combination, in the revolving armature, of two or more layers of armature-coils having radial wires connected alternately at their outer and inner ends, and placed at progressive angles to the axis of rotation, substantially as set forth.

5. The combination, in an armature, of numerous coils forming loops, with the side portions of each loop in the line of the radius, substantially as set forth.

Signed by me this 15th day of December, A. D. 1882.

FRIEDRICH GUSTAV FRICK.

Witnesses:
  MAJOR SUERMONDT,
  P. TACK.